(12) United States Patent
Troia et al.

(10) Patent No.: US 10,906,506 B2
(45) Date of Patent: Feb. 2, 2021

(54) SECURITY OF USER DATA STORED IN SHARED VEHICLES

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 223 days.

(21) Appl. No.: 15/856,522

(22) Filed: Dec. 28, 2017

(65) Prior Publication Data

US 2019/0202399 A1    Jul. 4, 2019

(51) Int. Cl.
| | | |
|---|---|---|
| *B60R 25/102* | (2013.01) | |
| *H04W 12/06* | (2009.01) | |
| *B60W 40/08* | (2012.01) | |
| *B60R 25/24* | (2013.01) | |
| *H04L 29/08* | (2006.01) | |

(Continued)

(52) U.S. Cl.
CPC ............ *B60R 25/102* (2013.01); *B60R 25/24* (2013.01); *B60W 40/08* (2013.01); *G06Q 10/02* (2013.01); *G06Q 30/0645* (2013.01); *G06Q 50/30* (2013.01); *H04L 63/102* (2013.01); *H04L 67/12* (2013.01); *H04L 67/306* (2013.01); *H04W 4/40* (2018.02); *H04W 12/06* (2013.01); *H04W 12/08* (2013.01); *B60R 2025/1016* (2013.01); *B60R 2325/10* (2013.01); *B60R 2325/205* (2013.01); *B60W 2040/0809* (2013.01)

(58) Field of Classification Search
CPC ........ B60R 2025/1016; B60R 2325/10; B60R 2325/205; B60R 25/102; B60R 25/24; B60W 10/18; B60W 10/20; B60W 2040/0809; B60W 30/025; B60W 40/08; G05D 1/0088; G06N 3/04; G06N 3/08; G06Q 10/02; G06Q 30/0645; G06Q 50/30; H04L 63/102; H04L 67/12; H04L 67/306; H04W 12/06; H04W 12/08; H04W 4/40

See application file for complete search history.

(56) References Cited

U.S. PATENT DOCUMENTS

| | | | |
|---|---|---|---|
| 6,388,558 B1 * | 5/2002 | Emmei | ................... B60R 25/04 340/5.1 |
| 7,917,888 B2 | 3/2011 | Chong et al. | |

(Continued)

OTHER PUBLICATIONS

International Search Report and Written Opinion, PCT/US2018/068132, dated May 1, 2019.

(Continued)

*Primary Examiner* — Babar Sarwar
(74) *Attorney, Agent, or Firm* — Greenberg Traurig

(57) ABSTRACT

User data stored in memory of a shared vehicle is managed in a secure manner. In some embodiments, user data stored in the vehicle is deleted in response to receiving a communication that initiates closing of usage of the vehicle (e.g., from a client device of a user that is operating the vehicle). A new user of a vehicle is prevented from being able to read or use private data of a prior user. In some embodiments, when authorizing usage of a vehicle by a new user, the vehicle is caused to delete the prior user data. After the prior user data has been deleted, a notification is received from the vehicle confirming that the vehicle has deleted the prior user data.

19 Claims, 3 Drawing Sheets

(51) Int. Cl.

| | | |
|---|---|---|
| *H04W 4/40* | (2018.01) | |
| *G06Q 10/02* | (2012.01) | |
| *H04W 12/08* | (2009.01) | |
| *H04L 29/06* | (2006.01) | |
| *G06Q 50/30* | (2012.01) | |
| *G06Q 30/06* | (2012.01) | |
| *B60R 25/10* | (2013.01) | |

(56) References Cited

U.S. PATENT DOCUMENTS

| | | | |
|---|---|---|---|
| 7,934,049 B2 | 4/2011 | Holtzman et al. | |
| 8,068,614 B2 | 11/2011 | Kumar et al. | |
| 9,049,005 B2 | 6/2015 | Cho et al. | |
| 9,489,540 B2 | 11/2016 | Lee et al. | |
| 9,563,774 B1 | 2/2017 | Litvin | |
| 9,858,208 B2 | 1/2018 | Connolly et al. | |
| 10,310,505 B1* | 6/2019 | Hanson | G05D 1/0274 |
| 10,332,124 B2* | 6/2019 | Avary | H04W 12/02 |
| 10,715,321 B2* | 7/2020 | Mondello | H04L 9/0866 |
| 10,778,661 B2* | 9/2020 | Mondello | H04L 63/062 |
| 2003/0033175 A1* | 2/2003 | Ogura | G06Q 10/02 |
| | | | 705/5 |
| 2004/0249663 A1* | 12/2004 | Shishido | G06Q 30/0645 |
| | | | 455/3.04 |
| 2007/0300207 A1 | 12/2007 | Booth et al. | |
| 2008/0148061 A1 | 6/2008 | Hongxia Jin et al. | |
| 2009/0222672 A1 | 9/2009 | Clarke et al. | |
| 2010/0228997 A1 | 9/2010 | Cheng et al. | |
| 2010/0241841 A1 | 9/2010 | Buer | |
| 2010/0313056 A1* | 12/2010 | Margolis | G06F 21/57 |
| | | | 713/500 |
| 2011/0191837 A1 | 8/2011 | Guajardo Merchan et al. | |
| 2012/0313796 A1* | 12/2012 | Lee | G07C 9/00309 |
| | | | 340/989 |
| 2013/0047144 A1 | 2/2013 | Chalmers et al. | |
| 2013/0185548 A1 | 7/2013 | Djabarov et al. | |
| 2013/0279689 A1 | 10/2013 | Obaidi | |
| 2014/0032933 A1 | 1/2014 | Smith et al. | |
| 2014/0108786 A1 | 4/2014 | Kreft | |
| 2014/0195100 A1* | 7/2014 | Lundsgaard | G06Q 50/30 |
| | | | 701/29.6 |
| 2014/0230061 A1 | 8/2014 | Higbee et al. | |
| 2014/0240089 A1* | 8/2014 | Chang | G06Q 20/3223 |
| | | | 340/5.61 |
| 2015/0012737 A1 | 1/2015 | Newell | |
| 2015/0038090 A1* | 2/2015 | Chang | H04W 12/0608 |
| | | | 455/66.1 |
| 2015/0092939 A1 | 4/2015 | Gotze et al. | |
| 2015/0348179 A1 | 12/2015 | Kamisawa | |
| 2016/0055068 A1 | 2/2016 | Jeansonne et al. | |
| 2016/0062361 A1* | 3/2016 | Nakano | G05D 1/024 |
| | | | 701/25 |
| 2016/0128016 A1* | 5/2016 | Avary | H04W 12/02 |
| | | | 455/517 |
| 2016/0357963 A1* | 12/2016 | Sherman | G06F 21/566 |
| 2017/0017808 A1 | 1/2017 | Kwong et al. | |
| 2017/0109533 A1 | 4/2017 | Shah et al. | |
| 2017/0126414 A1 | 5/2017 | Goel et al. | |
| 2018/0157259 A1* | 6/2018 | Myslinski | H04N 7/183 |
| 2018/0234498 A1 | 8/2018 | Sangameswaran et al. | |
| 2018/0373598 A1 | 12/2018 | Mondello et al. | |
| 2019/0068361 A1 | 2/2019 | Ye et al. | |
| 2019/0174514 A1* | 6/2019 | Ramesh | H04W 4/021 |
| 2019/0199525 A1 | 6/2019 | Mondello et al. | |
| 2019/0221139 A1 | 7/2019 | Schrijen et al. | |
| 2019/0229913 A1 | 7/2019 | Fava et al. | |
| 2019/0316921 A1* | 10/2019 | Osawa | G08G 1/00 |
| 2019/0334882 A1 | 10/2019 | Mondello et al. | |
| 2019/0372964 A1* | 12/2019 | Newton | G06F 21/31 |

OTHER PUBLICATIONS

Emmanuel Owusu, et al.: "OASIS: on achieving a sanctuary for integrity and secrecy on untrusted platforms", CCS'13 Proceedings of the 2013 ACM SIGSAC conference on Computer & communications security, Nov. 8, 2013. See sections 4, 6.2.

International Search Report and Written Opinion, PCT/US2018/063143, dated Mar. 12, 2019.

International Search Report and Written Opinion, PCT/US2018/063641, dated Jun. 27, 2019.

International Search Report and Written Opinion, PCT/US2019/028303, dated Aug. 6, 2019.

* cited by examiner

SECURITY OF USER DATA STORED IN SHARED VEHICLES

FIELD OF THE TECHNOLOGY

At least some embodiments disclosed herein relate to security of stored user data in vehicles in general and more particularly, but not limited to security of stored user data in vehicles that are shared amongst multiple users (e.g., a rental vehicle).

BACKGROUND

Vehicles are often shared by two or more users. Examples of shared vehicles include rental vehicles that are used by numerous users that are unrelated to one another.

Modern vehicles are designed to store large quantities of data related to the operation of the vehicle. This data typically includes personal data associated with an owner of the vehicle. Examples of such personal data include contacts, navigation paths, addresses, etc.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
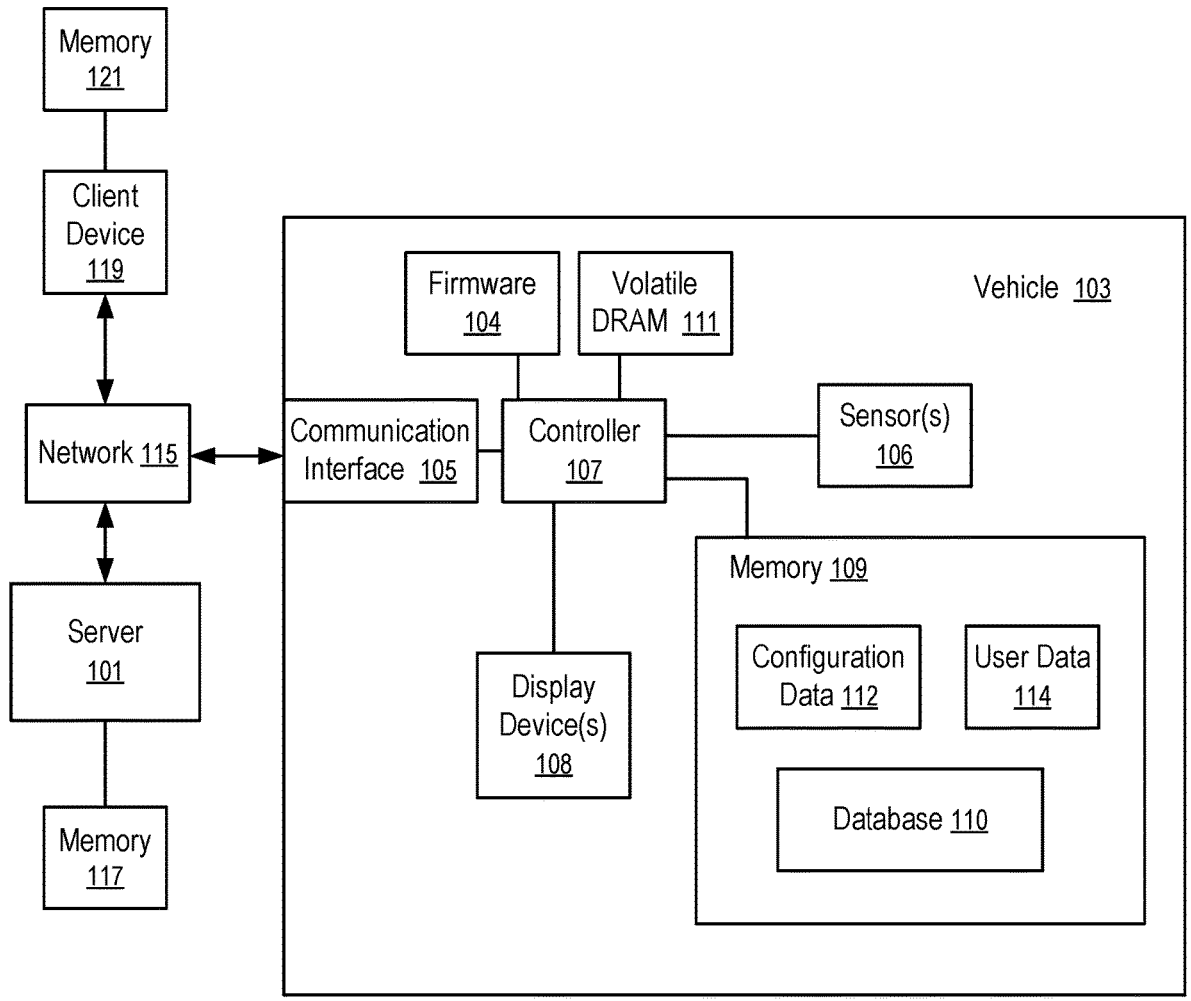
FIG. 1 shows a system for deleting user data from memory of a vehicle, according to one embodiment.

At least some embodiments disclosed herein provide systems and methods for deleting user data that has been stored in memory of a vehicle. For example, the vehicle may be a rental vehicle that is shared by numerous users. The rental vehicle stores data associated with a user of the rental vehicle. For example, this user data may be stored in a local cache or other storage area of memory of the rental vehicle (e.g., memory of a navigation system, or memory of an information and/or entertainment system of the vehicle). User data stored in a vehicle may include, for example, contact lists, navigation addresses, account access credentials, and/or data regarding persons that have connected with various online services using applications of a mobile or other client device, or otherwise when in a vehicle.

For example, when an owner of a vehicle gives a vehicle to another person for operation, this other person is typically trusted by the owner. However, for a shared vehicle such as a rental vehicle, a new operator of the vehicle is not known by the owner. Thus, sharing of vehicles amongst unrelated users creates undesirable privacy and data security problems.

In general, the storage of user data above causes a technical problem associated with security and management of such data when a user of a vehicle changes. For example, when the user desires to terminate usage of a rental vehicle, and the rental data record is closed by a rental car server, user data of the user needs to be deleted from the vehicle. Determining the timing and/or conditions for deleting user data from a vehicle, and/or managing communications between the vehicle and/or a client device of the user regarding such user data also cause a technical problem.

The systems and methods for the various embodiments as described below provide a solution to one or more of the technical problems above. These embodiments provide a way to delete user data stored in a vehicle, for example when rental of a vehicle is being closed and a new user will be operating the vehicle. At least some of these embodiments prevent a new user from being able to read or use private data of a prior user. For example, this can avoid a new user having the ability to track locations or other activities associated with a prior driver.

Various embodiments below can be implemented in numerous types of vehicles. These vehicles include, for example, rental vehicles, commercial vehicles, and vehicles such as automobiles and trucks, etc.

Some embodiments below permit private user data to be stored at a central server so that the user data can be, for example, downloaded to a new vehicle when the user desires to use the new vehicle. Downloading this stored user data can provide the benefits of avoiding the need to re-synchronize data of the user with the new vehicle when the user is starting usage of the vehicle, and to avoid wasting time in re-setting or re-configuring operational features of a vehicle such as, for example, its navigation or entertainment systems. In one embodiment, the storage of this user data at the central server is performed prior to deleting the user data from the vehicle that will no longer be used by the user.

In some embodiments, various communications and/or ways of deleting user data as described below can also be used when, for example, a vehicle has been stolen. For example, an owner or user of a stolen vehicle can initiate a command on a client device that causes all of the owner or user's data to be deleted from the vehicle.

Various embodiments described below provide a way to delete user data stored in a vehicle. In some cases, the user data is deleted in response to a vehicle being authorized for operation, such as booking of a new rental record by a new user. In other cases, user data is deleted in response to usage of a vehicle being terminated by the user or otherwise being closed (e.g., by a rental car server in response to a request from the user, or in response to un-authorized activity by the user when operating the rental vehicle). In yet other cases, user data can be deleted from a vehicle in response to a command initiated by the user associated with the user data, such as for example initiating an action using an application on, and/or sending a message from, a mobile device of the user. Thus, deletion of user data as described below provides a new way of providing improved security and management of stored user data for shared vehicles.

FIG. 1 shows a system for deleting user data 114 from memory 109 of a vehicle 103, according to one embodiment. Communication amongst two or more of the vehicle 103, a server 101, and a client device 119 can be performed over a network 115 (e.g., Internet and/or wireless or other network). This communication is performed using communication interface 105.

In one embodiment, the server 101 generates an authorization for usage of the vehicle 103 by a new user. The memory 109 of the vehicle 103 stores prior user data 114 for a prior user of the vehicle. After generating the authorization, the server 101 causes the vehicle to delete the prior user data 114 from the memory 109 of the vehicle 103. After the prior user data 114 is deleted, the server 101 receives a notification that the vehicle 103 has deleted the prior user data.

In one embodiment, the server 101 controls the loading of new user data of the new user into the memory 109 of the vehicle. In one embodiment, prior to generating the authorization for usage of the vehicle, user data of the new user has been stored on memory 117 at the server 101 (e.g., this user data is associated with usage of a prior vehicle by the new user). After generating the authorization for usage of the vehicle, the server 101 sends this stored new user data to the vehicle for loading into memory of the vehicle.

In one embodiment, data associated with opening and/or closing a booking or other usage of vehicle 103 is stored in a memory 121 of client device 119. For example, this data may provide authorization credentials or other data that permit a user of client device 119 to access the vehicle 103, such as by opening a door and/or starting the engine of vehicle.

A controller 107 controls one or more operations of the vehicle 103. For example, controller 107 controls the deletion of user data 114 from the memory 109. Controller 107 also controls loading of new user data into the memory 109 and/or other memory of the vehicle 103. Controller 107 also controls display of information on display device(s) 108. Sensor(s) 106 provide data regarding operation of the vehicle 103. At least a portion of this operational data can be communicated to the server 101 and/or the client device 119.

Memory 109 can further include, for example, configuration data 112 and/or database 110. Configuration data 112 can be, for example, data associated with operation of the vehicle 103 as provided by the server 101. The configuration data 112 can be, for example, data that constrains operation of the vehicle 103, for example based on conditions associated with a booking of a rental vehicle.

Database 110 can store, for example, data collected by sensors 106. Database 110 also can store, for example, navigational maps and/or other data provided by the server 101 in response to opening of a record for usage of the vehicle 103 by a new user.

In one embodiment, a notification of authorization for usage of vehicle 103 is sent to the client device 119. Server 101 also may send a communication to vehicle 103 that includes an indication of this authorization.

In one embodiment, after user data of a prior user has been deleted from memory 109, server 101 receives a confirmation from vehicle 103 that the vehicle is in a booked state. When a vehicle is in a booked state, data regarding activity of vehicle 103 can be communicated to server 101. This activity may include navigational and/or other operational aspects of the vehicle 103.

In one embodiment, the server 101 authorizes a booking by sending (e.g., to client device 119) data such as, for example, a PIN, NFC ID coordinates of a user, and/or providing data regarding usage by the user of a fingerprint and/or other biometric characteristics of a user. The user can, for example, use some or all of this data to access the vehicle 103. The user also can receive, for example, an approval from server 101 with and/or indicating an authorization for usage of vehicle 103 on client device 119.

In one embodiment, the server 101 checks the identity of a new user, deletes prior user data from the vehicle 103, and loads new user data (e.g., which was previously stored in memory 117 at server 101 during a prior usage of vehicle 103, or a prior usage of a different vehicle).

In one embodiment, the server 101 receives from the client device 119 of a user, a notification regarding termination of usage of the vehicle 103 by the user. In response to receiving the notification, the server 101 sends a request to the vehicle 103 for a status report and/or other data regarding the vehicle 103.

In response to the request, the server 101 receives the status report, and then the server 101 causes (e.g., by sending a communication to the vehicle 103 based on data in the status report) the vehicle 103 to delete user data 114 of the user from memory 109. Subsequent to receiving the notification regarding termination of usage of the vehicle 103 by the user, the server 101 closes usage of the vehicle 103 by the user (e.g., by updating a data record in a database of the server 101). In one embodiment, closing usage of the vehicle includes the server 101 sending a communication to the vehicle 103 that causes the vehicle to prevent further usage by the user.

In one embodiment, when the user is initiating the closing of usage of a rental vehicle, the server 101 sends a request to the vehicle 103 for a status report. For example, the vehicle 103 may communicate to the server 101 that the vehicle is not ready to close usage (e.g., because a door is open or the vehicle is unlocked). The server 101 and/or the prior or new user can take actions as needed to prepare the vehicle for closing usage. In some embodiments, the vehicle 103 itself can take various actions. When all such actions are completed, the user data of the prior user driver is deleted from memory 109. In one embodiment, the vehicle 103 sends a confirmation to server 101 that all actions and/or other vehicle device states are appropriate for closing usage. In response to receiving this confirmation, server 101 closes the usage of vehicle 103. Server 101 can, for example, send a communication regarding closing of usage to client device 119, another client device, and/or vehicle 103.

In one embodiment, after the user sends a message to server 101 from client device 119 indicating the desire to end usage of a rental vehicle, user data of the user is saved into a user profile in memory 117 of server 101 for future use in future vehicles. After confirming that the user data is saved at the server 101 and/or deleted from vehicle 103, server 101 closes usage of the vehicle.

As illustrated in FIG. 1, a controller 107 also may control the display of images on one or more display devices 108. Display device 108 can be a liquid crystal display. The controller 107 may receive data collected by one or more sensors 106. The sensors 106 may be, for example, mounted in the vehicle 103. The sensors 106 may include, for example, a camera, a microphone, a motion detector, and/or a camera. The sensors 106 also may include, for example, sensors incorporated in wearable devices worn by, or a client device of, the driver and/or passengers in the vehicle 103.

The sensors 106 may provide various types of data for collection by the controller 107. For example, the collected data may include image data from the camera and/or audio data from the microphone.

In one embodiment, the image data includes images of one or more faces of the driver and/or passengers. In another embodiment, the collected data includes biometric data for one or more persons in the vehicle 103. The biometric data may be provided, for example, by a wearable device.

In one embodiment, the controller 107 analyzes the collected data from the sensors 106. The analysis of the collected data includes providing some or all of the collected data to server 101.

In one embodiment, memory 109 stores database 110, which may include data collected by sensors 106 and/or data received by communication interface 105 from a computing device, such as, for example, server 101. For example, this communication may be used to wirelessly transmit collected data from the sensors 106 to the server 101. The data received by the vehicle may include configuration or other data used to configure control of the display devices 108 by controller 107.

In one embodiment, opening usage or booking of a vehicle can include, for example, authenticating a user and/or recognizing an identity of the user. The user can communicate a request to server 101 regarding usage of a specific vehicle, such as by providing an identifier for the vehicle (e.g., a photo of a vehicle license plate). In response to the request regarding usage, server 101 sends a message to the identified vehicle to check its status. The identified vehicle may respond that it is in an available state. Opening the usage of the vehicle can include, for example, synchronizing user data of a new user to vehicle 103.

In one embodiment, closing usage of the vehicle 103 can include, for example, the current user of the vehicle disconnecting client device 119 from the vehicle. The user can, for example, close doors and/or lock the vehicle. Then, the user sends an end of rental message (or other notification of usage termination) to server 101. In response, the server 101 sends a request to the vehicle requesting a status report. In response, the vehicle 103 replies that the vehicle is in a state appropriate for closing the usage. For example, all doors are closed and the vehicle is locked. In response, the server 101 closes usage of the vehicle. Also, the vehicle 103 itself can change its configuration, for example, using controller 107 and updating configuration data 112 to correspond to a closed usage state as regards this user.

In some embodiments, access to a vehicle (or another activity involving the vehicle) is required by persons other than a prior or new operating user of a vehicle. For example, maintenance personnel periodically need to access a vehicle to perform maintenance operations and/or to prepare the vehicle for a new user (e.g., physical cleaning, arranging, etc.).

In one embodiment, server 101 (e.g., a car maker server) triggers deletion of user data 114 at closing of usage of vehicle 103 by a prior user. At opening of the vehicle 103 for usage by a new user, verification of data deletion by vehicle 103 is made. In case of failure of data to be deleted (e.g., vehicle 103 notifies server 101 that prior user data was not able to be deleted, for example, in a status report that provides reasons such as a low battery, etc.), a new erasure of the user data is or will be performed before giving the vehicle access to the new user (e.g., before providing a new profile for the new user to vehicle 103). For example, this new erasure/deletion can be performed by sending another, follow-up communication to vehicle 103 that requests and/or causes deletion of the prior user data (e.g., that was not previously deleted after an initial deletion communication request).

In some embodiments, the vehicle 103 is not able to delete data due to a low battery power condition of the vehicle. Deletion of the prior user data can be, for example, requested of the vehicle after battery power (and/or another physical/operating/configuration condition of the vehicle) has been restored, updated, or repaired.

In some cases, for example, maintenance personnel need to open the vehicle 103. In one embodiment, a maintenance user/person is given a special authorization level and/or condition by server 101 (e.g., without needing to be logged in as an operating user per se). This may occur when, for instance, the battery is low.

In one embodiment, the maintenance service personnel is treated as a "super user" with a higher level of access rights than an operating user of a vehicle (e.g., the prior or new user of a rental vehicle).

In some embodiments, access by maintenance will trigger normal erasure/deletion operations prior to and/or during the full time that maintenance is accessing (or has access to) the vehicle. For example, opening of access by maintenance itself can be a trigger to cause deletion of prior user data (and/or delay updating or adding of new profile data for a new user). This prevents maintenance people from knowing the prior user's private information/data. This trigger may occur even when a prior delete data request has been made to vehicle 103 by server 101. For example, this prior delete data request may have failed to actually cause deletion of the prior user data. The foregoing trigger can cause actual deletion of the user data.

In another example, maintenance needs to open vehicle 103, but the battery power is too low for vehicle 103 to actually cause deletion of the prior user data from memory. In this case, the prior user's private/personal data is still in the vehicle (but without being able to be erased, due to the low battery). Deleting prior user data as triggered by maintenance access (e.g., at the start/opening of such maintenance access and/or at the end/closing of such maintenance access) prevents improper access by a new user (and/or by maintenance). Also, causing deletion of prior user data when closing usage of the prior user (even if such deletion occurs after maintenance access to, for example, repair a battery as described above), will maintain the security of the prior user data.

In FIG. 1, firmware 104 controls, for example, the operations of the controller 107 in deleting and loading user data, as described herein. The controller 107 also can, for example, run the firmware 104 to perform operations responsive to communications from the server 101. Firmware in general is a type of computer program that provides control, monitoring and data manipulation of engineered computing devices.

The vehicle 103 includes volatile Dynamic Random-Access Memory (DRAM) 111 for the storage of run-time data and instructions used by the controller 107 to improve the computation performance of the controller 107 and/or provide buffers for data transferred between the server 101 and memory 109. DRAM 111 is volatile in that it requires power to maintain the data/information stored therein, which data/information is lost immediately or rapidly when the power is interrupted.

Volatile DRAM 111 typically has less latency than non-volatile storage media, but loses its data quickly when power is removed. Thus, it is advantageous to use the volatile DRAM 111 to temporarily store instructions and data used for the controller 107 in its current computing task to improve performance. In some instances, the volatile DRAM 111 is replaced with volatile Static Random-Access Memory (SRAM) that uses less power than DRAM in some applications. When the memory 109 has data access performance (e.g., in latency, read/write speed) comparable to volatile DRAM 111, the volatile DRAM 111 can be eliminated; and the controller 107 can perform computing by operating on the memory 109 for instructions and data instead of operating on the volatile DRAM 111.

In one embodiment, memory 109 includes a non-volatile storage media, such as magnetic material coated on rigid disks, and/or memory cells in an integrated circuit. The storage media is non-volatile in that no power is required to maintain the data/information stored in the non-volatile storage media, which data/information can be retrieved after the non-volatile storage media is powered off and then powered on again.

In one embodiment, memory 109 is implemented using various memory/storage technologies, such as NAND gate based flash memory, phase-change memory (PCM), magnetic memory (MRAM), resistive random-access memory, and 3D XPoint, such that the memory 109 is non-volatile and can retain data stored therein without power for days, months, and/or years.

For example, cross point storage and memory devices (e.g., 3D XPoint memory) have data access performance comparable to volatile DRAM 111. A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers.

In one embodiment server 101 communicates with the communication interface 105 via a communication channel having a predetermined protocol.

In one embodiment, the server 101 can be a computer having one or more Central Processing Units (CPUs) to which vehicles, such as the vehicle 103, may be connected using a computer network. For example, in some implementations, the communication channel between the server 101 and the communication interface 105 includes a computer network, such as a local area network, a wireless local area network, a cellular communications network, or a broadband high-speed always-connected wireless communication connection (e.g., a current or future generation of mobile network link).

In some instances, the controller 107 has in-processor cache memory with data access performance that is better than the volatile DRAM 111 and/or the memory 109. In some instances, the controller 107 has multiple processors, each having its own in-processor cache memory.

In one embodiment, the controller 107 performs data intensive, in-memory processing using data and/or instructions organized in memory 109 or otherwise organized in the vehicle 103. For example, the controller 107 can perform a real-time analysis of a set of data collected and/or stored in the vehicle 103. For example, in some applications, the vehicle 103 is connected to real-time sensors 106 to store sensor inputs; and the processors of the controller 107 are configured to perform machine learning and/or pattern recognition based on the sensor inputs to support an artificial intelligence (AI) system that is implemented at least in part via the vehicle 103 and/or the server 101. This analysis of data can be, for example, associated with operation of a rental or other vehicle. This analysis can include, for example, analysis of user data 114.

The vehicle 103 can interact with various computing systems, such as a cloud computing system, an edge computing system, a fog computing system, and/or a standalone computer. In a cloud computing system, remote computer servers are connected in a network to store, manage, and process data. An edge computing system optimizes cloud computing by performing data processing at the edge of the computer network that is close to the data source and thus reduces data communications with a centralized server and/or data storage. A fog computing system uses one or more end-user devices or near-user edge devices to store data and thus reduces or eliminates the need to store the data in a centralized data warehouse.

At least some embodiments of the systems and methods disclosed herein can be implemented using computer instructions executed by the controller 107, such as the firmware 104. In some instances, hardware circuits can be used to implement at least some of the functions of the firmware 104. The firmware 104 can be initially stored in non-volatile storage media, such as by using memory 109, or another non-volatile device, and loaded into the volatile DRAM 111 and/or the in-processor cache memory for execution by the controller 107.

For example, the firmware 104 can be configured to use the techniques discussed below for deleting and/or loading user data in memory of the vehicle. However, the techniques discussed below are not limited to being used in the vehicle 103 of FIG. 1 and/or the examples discussed above.

Various additional embodiments are now described below that can be used with server 101 and vehicle 103. In one embodiment, a system includes: at least one processor; and memory containing instructions configured to instruct the at least one processor to: authorize usage of a vehicle by a new user, wherein memory of the vehicle stores prior user data for a prior user of the vehicle; after authorizing the usage of the vehicle, cause the vehicle to delete the prior user data; and after the prior user data is deleted, receive a notification that the vehicle has deleted the prior user data.

In one embodiment, authorizing the usage of the vehicle includes sending a notification of the authorization to a client device of the new user.

In one embodiment, authorizing the usage of the vehicle includes sending an identifier or data to a client device of the new user, and wherein the identifier or data enables at least one of starting the vehicle or opening a door of the vehicle.

In one embodiment, the instructions are further configured to instruct the at least one processor to send a communication causing configuration of a client device of the new user for opening or starting the vehicle.

In one embodiment, the instructions are further configured to instruct the at least one processor to, after the new user has opened or started the vehicle, receive an indication from the vehicle that the vehicle is in a booked state.

In one embodiment, the instructions are further configured to instruct the at least one processor to send a notification to a client device of the prior user that the prior user data has been deleted from the vehicle.

Figure 2:
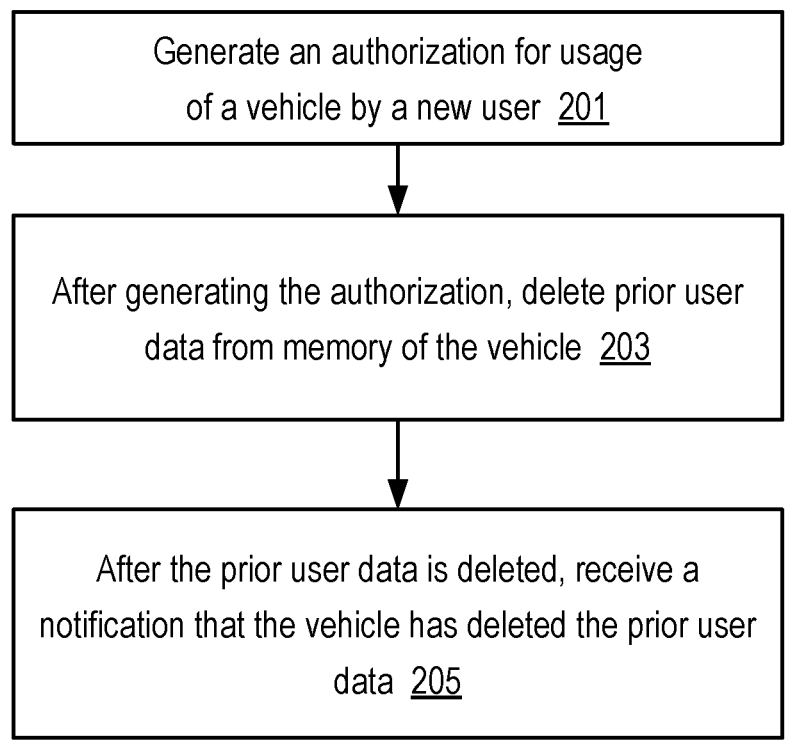
FIG. 2 shows a method to delete prior user data from memory of a vehicle, according to one embodiment.

FIG. 2 shows a method to delete prior user data from memory of a vehicle, according to one embodiment. At block 201, an authorization is generated for usage of a vehicle by a new user. The new user can be, for example, a person that has requested a rental vehicle. For example, the method can be implemented for the vehicle 103 of FIG. 1 using server 101.

At block 203, after generating the authorization, prior user data is deleted from memory of the vehicle. At block 205, after the prior user data is deleted, a notification is received confirming that the vehicle has actually deleted the prior user data from the memory. In one example, user data 114 is deleted from memory 109 of FIG. 1 above.

Various additional embodiments are now described below. In one embodiment, a method implemented by server 101 includes: generating, by the server, an authorization for usage of a vehicle by a new user, wherein memory of the vehicle stores prior user data for a prior user of the vehicle; after generating the authorization, causing, by the server, the vehicle to delete the prior user data from the memory of the vehicle; and after the prior user data is deleted, receiving, by the server, a notification that the vehicle has deleted the prior user data.

In one embodiment, the method can further include causing loading of new user data of the new user into the memory of the vehicle.

In one embodiment, the method can further include: prior to generating the authorization for usage of the vehicle, storing the new user data on memory at the server, wherein the new user data is associated with usage of a prior vehicle by the new user; and after generating the authorization for usage of the vehicle, sending, by the server, the new user data to the vehicle for loading into the memory of the vehicle.

In one embodiment, the method can further include sending, by the server, a notification of the authorization to a client device of the new user.

In one embodiment, the method can further include sending, by the server, a communication to the vehicle that includes an indication of the authorization.

In one embodiment, the method can further include, after the prior user data is deleted, receiving, by the server, a confirmation from the vehicle that the vehicle is in a booked state. In one embodiment, the method can further include, when the vehicle is in the booked state, receiving, by the server, at least one communication from the vehicle comprising data regarding activity of the vehicle while being operated by the new user.

Figure 3:
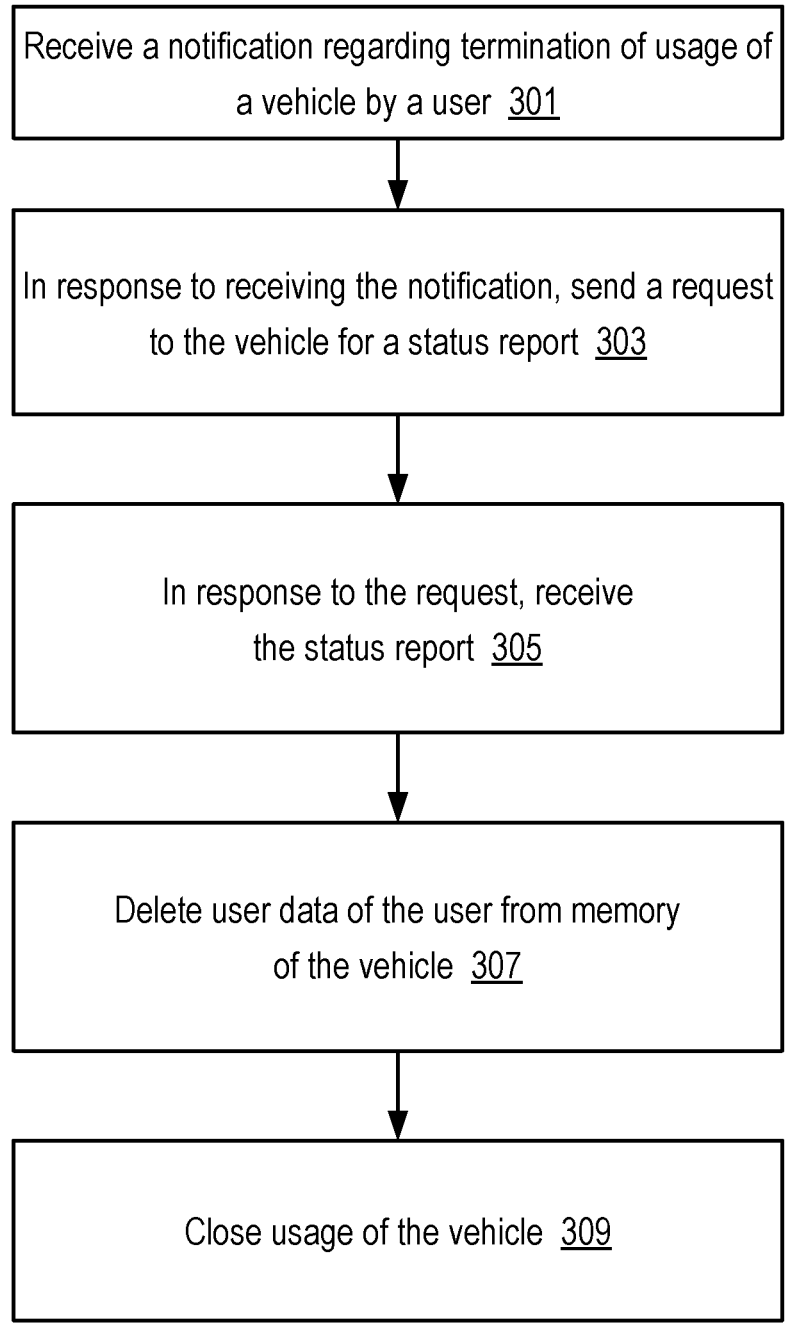
FIG. 3 shows a method to delete user data of a user from memory of a vehicle, according to one embodiment.

FIG. 3 shows a method to delete user data of a user from memory of a vehicle, according to one embodiment. At block 301, a notification is received regarding termination of usage of a vehicle by a user. The user can be, for example, a person ending or terminating usage of a rental vehicle (e.g., by sending a message to server 101, or another computing device, using an application on the client device 119). For example, the method can be implemented for the vehicle 103 of FIG. 1 using server 101 and client device 119.

At block 303, in response to receiving a notification, a request is sent to the vehicle for a status report, or for other data associated with the history and/or status of the vehicle. At block 305, in response to this request, the status report is received, for example by server 101.

At block 307, user data of the user is deleted from memory of the vehicle. In some cases, new user data is downloaded to the memory in response to preparing the vehicle for use by the new user.

At block 309, usage of the vehicle is closed. For example, server 101 may update a data record in a database to indicate that the user is no longer permitted to access and/or operate the vehicle.

Various additional embodiments are now described below. In one embodiment, a method implemented by server 101 includes: receiving, by the server from a client device of a user, a notification regarding termination of usage of a vehicle by the user; in response to receiving the notification, sending, by the server, a request to the vehicle for a status report regarding the vehicle; in response to the request, receiving, by the server, the status report; causing, by the server based on the status report, the vehicle to delete user data of the user from memory of the vehicle; and subsequent to receiving the notification regarding termination of usage of the vehicle by the user, closing, by the server, usage of the vehicle by the user.

In one embodiment, the method can further include, after the user data has been deleted from the memory of the vehicle, receiving, by the server, a notification that the vehicle has deleted the user data.

In one embodiment, closing usage of the vehicle is performed after the server has received the notification that the vehicle has deleted the user data.

In one embodiment, the method can further include, prior to receiving the notification regarding termination of usage of the vehicle, storing, by the server, the user data in memory at the server, wherein the user data is associated with operation of the vehicle by the user.

In one embodiment, causing the vehicle to delete the user data of the user from the memory of the vehicle is performed after storing the user data in memory at the server. In one embodiment, closing usage of the vehicle is performed after the server confirms, based on the status report, that the vehicle is ready for closing usage. In one embodiment, closing usage of the vehicle comprises sending, by the server, a communication to the vehicle that causes the vehicle to prevent further usage of the vehicle by the user.

In various embodiments, a non-transitory computer storage medium is used to store instructions of the firmware 104. When the instructions are executed by the controller 107 of the vehicle 103, the instructions cause the controller 107 to perform any of the methods discussed herein.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully-functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method implemented by a server, the method comprising:
    storing, by the server, new user data in memory at the server, wherein the new user data is associated with usage of a prior vehicle by a new user, the new user is associated with a booking of a vehicle, and the booking includes conditions on operation of the vehicle by the new user;
    generating, by the server, an authorization for usage of the vehicle by the new user, wherein memory of the vehicle stores prior user data for a prior user of the vehicle;
    after generating the authorization, causing, by the server, the vehicle to delete the prior user data from the memory of the vehicle;
    sending, by the server, the new user data to the vehicle for loading into the memory of the vehicle, wherein the vehicle is configured to download the new user data, and to constrain operation of the vehicle by the new user in accordance with the conditions of the booking; and
    after the prior user data is deleted, receiving, by the server, a notification that the vehicle has deleted the prior user data.

2. The method of claim 1, further comprising, causing loading of the new user data of the new user into the memory of the vehicle.

3. The method of claim 1, further comprising sending, by the server, a notification of the authorization to a client device of the new user.

4. The method of claim 1, further comprising sending, by the server, a communication to the vehicle that includes an indication of the authorization.

5. The method of claim 1, further comprising, after the prior user data is deleted, receiving, by the server, a confirmation from the vehicle that the vehicle is in a booked state.

6. The method of claim 5, further comprising, when the vehicle is in the booked state, receiving, by the server, at least one communication from the vehicle comprising data regarding activity of the vehicle while being operated by the new user.

7. A method implemented by a server, the method comprising:
    storing, by the server, new user data in memory at the server, wherein the new user data is associated with operation of a prior vehicle by a new user, the new user is associated with a booking of a vehicle, and the booking includes conditions on operation of the vehicle by the new user;
    receiving, by the server from a client device of a user, a notification regarding termination of usage of the vehicle by the user;
    in response to receiving the notification, sending, by the server, a request to the vehicle for a status report regarding the vehicle;
    in response to the request, receiving, by the server, the status report;
    causing, by the server based on the status report, the vehicle to delete user data of the user from memory of the vehicle;
    subsequent to receiving the notification regarding termination of usage of the vehicle by the user, closing, by the server, usage of the vehicle by the user; and
    sending, by the server, the new user data to the vehicle for loading into the memory of the vehicle, wherein the vehicle is configured to download the new user data, and to constrain operation of the vehicle by the new user in accordance with the conditions of the booking.

8. The method of claim 7, further comprising, after the user data has been deleted from the memory of the vehicle, receiving, by the server, a notification that the vehicle has deleted the user data.

9. The method of claim 8, wherein closing usage of the vehicle is performed after the server has received the notification that the vehicle has deleted the user data.

10. The method of claim 7, further comprising, prior to receiving the notification regarding termination of usage of the vehicle, storing, by the server, the new user data in memory at the server.

11. The method of claim 7, wherein causing the vehicle to delete the user data of the user from the memory of the vehicle is performed after storing the user data in memory at the server.

12. The method of claim 7, wherein closing usage of the vehicle is performed after the server confirms, based on the status report, that the vehicle is ready for closing usage.

13. The method of claim 7, wherein closing usage of the vehicle comprises sending, by the server, a communication to the vehicle that causes the vehicle to prevent further usage of the vehicle by the user.

14. A system comprising:
 at least one processor; and
 memory containing instructions configured to instruct the at least one processor to:
  store new user data in memory, wherein the new user data is associated with usage of a prior vehicle by a new user, the new user is associated with a booking of a vehicle, and the booking includes conditions on operation of the vehicle by the new user;
  authorize usage of the vehicle by the new user, wherein memory of the vehicle stores prior user data for a prior user of the vehicle;
  after authorizing the usage of the vehicle, cause the vehicle to delete the prior user data;
  send the new user data to the vehicle for loading into the memory of the vehicle, wherein the vehicle is configured to download the new user data, and to constrain operation of the vehicle by the new user in accordance with the conditions of the booking; and
  after the prior user data is deleted, receive a notification that the vehicle has deleted the prior user data.

15. The system of claim 14, wherein authorizing the usage of the vehicle comprises sending a notification of the authorization to a client device of the new user.

16. The system of claim 14, wherein authorizing the usage of the vehicle comprises sending an identifier or data to a client device of the new user, and wherein the identifier or data enables at least one of starting the vehicle or opening a door of the vehicle.

17. The system of claim 14, wherein the instructions are further configured to instruct the at least one processor to send a communication causing configuration of a client device of the new user for opening or starting the vehicle.

18. The system of claim 14, wherein the instructions are further configured to instruct the at least one processor to, after the new user has opened or started the vehicle, receive an indication from the vehicle that the vehicle is in a booked state.

19. The system of claim 14, wherein the instructions are further configured to instruct the at least one processor to send a notification to a client device of the prior user that the prior user data has been deleted from the vehicle.

\* \* \* \* \*